No. 735,725. PATENTED AUG. 11, 1903.
W. S. DE WOODY.
BROOM HANGER.
APPLICATION FILED SEPT. 26, 1902.
NO MODEL.
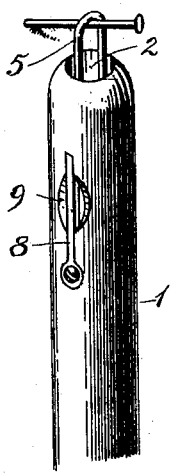
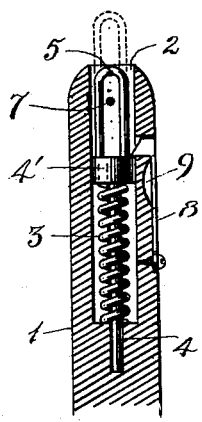

No. 735,725. Patented August 11, 1903.

UNITED STATES PATENT OFFICE.

WILFRED S. DE WOODY, OF FRANKLIN, PENNSYLVANIA.

BROOM-HANGER.

SPECIFICATION forming part of Letters Patent No. 735,725, dated August 11, 1903.

Application filed September 26, 1902. Serial No. 124,884. (No model.)

*To all whom it may concern:*

Be it known that I, WILFRED S. DE WOODY, a citizen of the United States, residing at Franklin, in the county of Venango and State of Pennsylvania, have invented a new and useful Improvement in Broom-Hangers, of which improvement the following is a specification.

My invention relates to broom-hangers; and its object is to provide a simple and efficient hanger conveniently carried in the handle of the broom and which can be readily exposed when it is desired to use the same.

My invention consists of a hanger-loop adapted to be held within the handle of the broom or the like and means for exposing the same when desired.

In the drawings like characters of reference refer to like parts throughout.
Figure 1 is a perspective view of my device with the hanger in use. Fig. 2 is a longitudinal section therethrough.

In the handle 1 of a broom or the like is formed a recess 2. A spring 3 is held centrally therein by means of the pin 4, extending into the handle. A cap 4, having attached thereto a loop 5, surrounds the upper end of said spring. The loop, cap, and spring are so proportioned as to permit the loop being pushed entirely within the recess 2 when not in use. A spring-stop 7 is held in said recess to limit the outward motion of said loop and take the weight of said broom when the hanger is in use. A catch 8 is held on the side of said handle, the end projecting inside of said recess to engage and hold said cap in its retracted position. The handle 1, before referred to, is provided with a suitable opening to permit the entrance of said catch, and there is also formed therein a recess 9 to permit the release of the catch.

When it is desired to use a broom or the like equipped with my device, the loop is pushed into the recess and is there held by the catch 8. Inserting the nail under the catch in the recess 9 and lifting the catch releases the spring and permits the latter to project the loop.

Having thus described my invention, what I claim as new, and desire to secure by Letters Patent, is—

1. In a hanger for brooms or the like, a handle provided with a recess in the upper end thereof, a spring having a loop extension held within said recess and means to lock said spring in tension and release the same.

2. In a hanger for brooms or the like, the handle provided with a recess in the upper end thereof, a spring having a loop extension normally projecting from said recess and a releasable catch to hold said spring in a state of tension and retain the loop within said recess.

3. In a hanger for brooms or the like, a handle provided with a recess in the upper end thereof, a spring held within said recess, a cap surrounding the upper end of said spring, a loop formed on said cap, a spring-stop held in said recess to limit the outward motion of said loop and cap, and a release-catch held to project within said recess and hold said loop therein when not in use.

In testimony whereof I have hereunto signed my name in the presence of two subscribing witnesses.

WILFRED S. DE WOODY.

In presence of—
  M. E. HARRISON,
  JOHN C. THOMPSON.